United States Patent
Wang (10) Patent No.: US 12,247,603 B2
(45) Date of Patent: Mar. 11, 2025

(54) ROTATING STRUCTURE

(71) Applicant: FIVEGRAND INTERNATIONAL CO., LTD., New Taipei (TW)

(72) Inventor: Ting-Jui Wang, New Taipei (TW)

(73) Assignee: FIVEGRAND INTERNATIONAL CO., LTD., New Taipei (TW)

( * ) Notice: Subject to any disclaimer, the term of this patent is extended or adjusted under 35 U.S.C. 154(b) by 346 days.

(21) Appl. No.: 17/872,020

(22) Filed: Jul. 25, 2022

(65) Prior Publication Data
US 2023/0061276 A1 Mar. 2, 2023

(30) Foreign Application Priority Data
Sep. 2, 2021 (TW) .................. 110132633

(51) Int. Cl.
*F16B 21/12* (2006.01)
(52) U.S. Cl.
CPC .................. *F16B 21/125* (2013.01)
(58) Field of Classification Search
CPC ............ H01R 13/6335; H01R 23/7005; F16B 21/125
USPC .................................................. 439/773, 160
See application file for complete search history.

(56) References Cited

U.S. PATENT DOCUMENTS

| 5,575,672 A * | 11/1996 | Katsuma | H01R 13/62933 439/157 |
| 5,997,326 A * | 12/1999 | Koradia | H01R 12/7005 439/372 |
| 6,381,146 B1 * | 4/2002 | Sevier | H05K 7/1411 361/740 |
| 7,070,431 B1 * | 7/2006 | White | G06F 1/184 439/160 |
| 7,749,006 B2 * | 7/2010 | Chiang | H05K 7/1409 439/160 |
| 8,109,774 B2 * | 2/2012 | Matsunaga | H01R 12/7005 439/607.14 |
| 8,708,720 B2 * | 4/2014 | Engelvin | F16B 2/14 439/160 |
| 2011/0212637 A1 * | 9/2011 | Colongo | H05K 7/1409 439/160 |
| 2012/0108093 A1 * | 5/2012 | Sato | H01R 13/62994 439/160 |
| 2019/0277329 A1 * | 9/2019 | Boyer | F16B 33/008 |

FOREIGN PATENT DOCUMENTS

TW M569055 U 10/2018

* cited by examiner

*Primary Examiner* — Gary F Paumen (57) ABSTRACT

A rotating structure includes a rotating part and a fixing piece. The rotating part has a lateral perforation part, the lateral perforation part is for perforating an object; the fixing piece is combined to the lateral perforation part and the object, so that the rotating part is movably combined with the object for making the rotating part rotate or move the object. Accordingly, the rotating structure of the present disclosure has the effects of simplicity of operation, saving labor and convenience.

13 Claims, 9 Drawing Sheets

ROTATING STRUCTURE

CROSS-REFERENCE TO RELATED APPLICATION

This non-provisional application claims priority under 35 U.S.C. § 119(a) on Patent Application No(s). 110132633 filed in Taiwan, R.O.C. on Sep. 2, 2021, the entire contents of which are hereby incorporated by reference.

BACKGROUND OF THE INVENTION

1. Field of the Invention

The present disclosure provides a rotating structure, and in particular to a rotating structure that is easy-handling, labor-saving and convenient.

2. Description of the Related Art

The traditional rack is usually equipped with an offload mechanism, the function of the offload mechanism is to separate the hard disk or circuit board from a port configured in the rack, the user rotates the offload mechanism, and the hard disk or circuit board will be pushed up and displaced, and then detached from the port. However, the offload mechanism of the traditional rack can only displace the hard disk or circuit board by a short distance, because of the rack partition or adjacent side-by-side devices, it results in difficult and inconvenient access for users.

BRIEF SUMMARY OF THE INVENTION

In view of the shortcomings of the above-mentioned prior art, the inventor developed a rotating structure, with a view to achieving the purposes of simplicity of operation, saving labor and convenience.

To achieve the above objective and other objectives, the present disclosure provides a rotating structure, comprising: a rotating part and a fixing piece. The rotating part has a lateral perforation part, the lateral perforation part is for perforating an object; the fixing piece is combined to the lateral perforation part and the object, so that the rotating part is movably combined with the object for making the rotating part rotate or move the object.

In the above-mentioned rotating structure, the lateral perforation part is located in a center position or near the center position of the rotating part.

In the above-mentioned rotating structure, the lateral perforation part is located in the center position or near the center position of the rotating part, a center of the object is also located in the center position or near the center position of the rotating part, so that the rotating part is rotated, and a pull force, thrust force, or abutting force, or lever force is generated.

In the above-mentioned rotating structure, the rotating part further comprises an abutting part, and the rotating part is rotated to abut another object with the abutting part, so that the other object generates a movement.

In the above-mentioned rotating structure, the fixing piece is a fastener having a head and a buckling part.

In the above-mentioned rotating structure, the head is movably combined with the buckling part, and the head is driven to bring the buckling part.

In the above-mentioned rotating structure, the fixing piece has a stop part, the rotating part has a corresponding stop part, the stop part and the corresponding stop part are for stopping the movable combination.

In the above-mentioned rotating structure, the fixing piece may be used to movably disassemble and assemble the object repeatedly in a state without leaving the rotating part.

In the above-mentioned rotating structure, the fixing piece is movably combined with the rotating part.

In the above-mentioned rotating structure, the rotating structure further comprises an elastic element, one end of the elastic element abuts against the rotating part, the other end of the elastic element abuts against the fixing piece.

In the above-mentioned rotating structure, the fixing piece is a threaded piece, a column, an outer fastening body, an inner fastening body, a fastening body or a snap body.

In the above-mentioned rotating structure, there is an anti-loosening substance in an intermediate space for anti-loosening at combining between the fixing piece and the fixing part of the rotating part, the anti-loosening substance is a soft substance, a colloidal substance, an elastic substance, a metallic substance, a plastic substance, a non-metallic substance, a flexible substance, a liquid substance, or a solid substance.

In the above-mentioned rotating structure, the rotating part is movably combined with a fastening part, the fastening part is combined with the rotating part by a joint part, and further comprises an elastic element, one end of the elastic element abuts against the rotating part, the other end of the elastic element abuts against the fastening part.

In the above-mentioned rotating structure, the rotating part has a blocking part, when the rotating part is rotated to an angle, the blocking part is used to block the object.

In the above-mentioned rotating structure, the blocking part is located in the lateral perforation part, or the blocking part is located in a center position or near the center position of one side of the lateral perforation part, or the blocking part is located in the near center position of the lateral perforation part.

In the above-mentioned rotating structure, the blocking part is a convex part, a concave part, a sheet, a block, provided in a wall surface of the lateral perforation part, or being a partial structure of the lateral perforation part, or the blocking part is a groove of the lateral perforation part, or the blocking part is a penetration of the lateral perforation part.

In the above-mentioned rotating structure, the rotating part has a fastening part, the fastening part is used to fasten to a corresponding fastening part.

In the above-mentioned rotating structure, the rotating part has a fixing part, after the object is placed in the lateral perforation part, the fixing piece passes through the object and combines with the fixing part, so that the rotating part is movably combined with the object.

In the above-mentioned rotating structure, the object is a printed circuit board, a chassis, a metallic sheet or a plastic body.

In the above-mentioned rotating structure, the object has a connector, the connector is used to connect with another connector of another object by on-state current, when the rotating structure is rotated, by rotating the force that abuts against an abutted object to drive, the connector is disengaged or loosened from the other connector.

In the above-mentioned rotating structure, the object has a connector, the connector is used to connect with another connector of another object by on-state current, when the rotating structure is rotated, by rotating the force that abuts against an abutted object to drive, the hot-swappable connector is disengaged or loosened from the other connector.

In the above-mentioned rotating structure, the object, the other object or the abutted object is a printed circuit board, motherboard, chassis, computer case, radiator, slide rail, cabinet, disk body, cage, air-cooled structure, water-cooled structure, structure immersed in water-cooled liquid, server structure or storage structure.

In the above-mentioned rotating structure, the rotating structure further comprises an elastic element, one end of the elastic element abuts against the rotating part, the other end of the elastic element abuts against the object to make the rotating part carry out reciprocating motion or reciprocating rotation with elastic force.

In the above-mentioned rotating structure, the lateral perforation part is a movable space with one-sided opening or double-sided opening, when used in the motion of the rotating structure, a limitation of the movable space is used, so that the object moves within a range of the movable space.

In the above-mentioned rotating structure, there is an elastomer or a cushion between the lateral perforation part and the object, the elastomer or the cushion is used to increase or decrease the friction force between the lateral perforation part and the object, or to provide a cushioning force between the lateral perforation part and the object, or to fill a space between the lateral perforation part and the object, or to provide an elastic force between the lateral perforation part and the object.

In the above-mentioned rotating structure, the elastomer or the cushion is a spring, spring plate, gasket, metallic object, plastic object, nylon gasket, Teflon gasket or washer.

In the above-mentioned rotating structure, the fixing piece is provided to pass through the lateral perforation part, the elastomer or the cushion and the object.

Accordingly, the rotating structure of the present disclosure has the effects of simplicity of operation, saving labor and convenience.

DETAILED DESCRIPTION OF THE INVENTION

To facilitate understanding of the above purpose, characteristics and effects of this present disclosure, embodiments together with the attached drawings for the detailed description of the present disclosure are provided as below.

Figure 1:
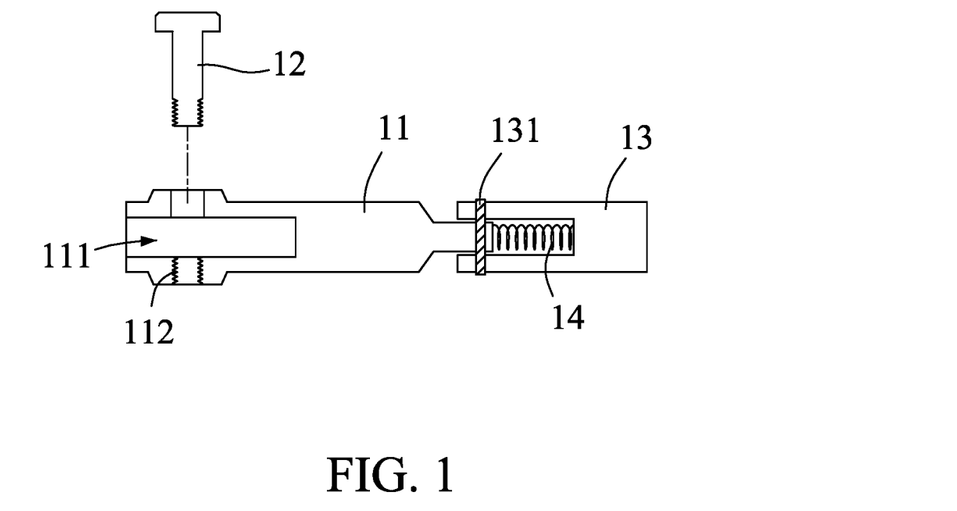
FIG. 1 is a schematic side view of a rotating structure of a first embodiment of the present disclosure.
Figure 2:
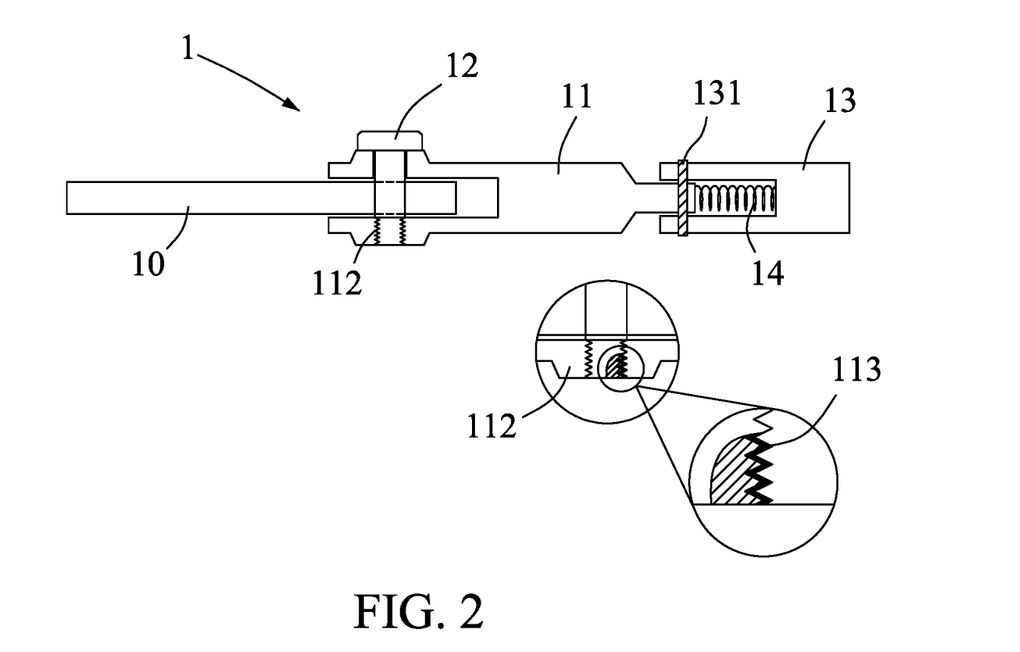
FIG. 2 is a schematic side view of a using state of the rotating structure of the first embodiment of the present disclosure.

Referring to FIGS. 1 and 2, as shown in the drawings, the present disclosure provides a rotating structure, the rotating structure 1 comprises: a rotating part 11 and a fixing piece 12.

The rotating part 11 has a lateral perforation part 111, the lateral perforation part 111 is for perforating an object 10.

The fixing piece 12 is combined to the lateral perforation part 111 and the object 10, so that the rotating part 11 is movably combined with the object 10 for making the rotating part 11 rotate or move the object 10.

When used, the rotating structure 1 may be movably combined with the object 10 by the fixing piece 12, whereby when the rotating part 11 carries out a rotational movement, the rotating part 11 abuts against or pushes on another object (not shown), so that the object 10 or the other object moves, and the effects of simplicity of operation, saving labor and convenience are achieved at moving the object 10 or the other object.

In one embodiment of the present disclosure, the rotating part 11 has a fixing part 112; and when the present disclosure is assembled, the object 10 may first be placed into the lateral perforation part 111, and then the fixing piece 12 passes through the object 10 and combines with the fixing part 112, so that the rotating part 11 is movably combined with the object 10; thus, the object 10 is movably combined with the lateral perforation part 111 firmly, in order to facilitate subsequent operations.

In one embodiment of the present disclosure, the lateral perforation part 111 is located in a center position or near the center position of the rotating part 11. Based on the fact that the lateral perforation part 111 is located in the center position or near the center position of the rotating part 11, after the object 10 is movably combined with the rotating part 11, a center of the object 10 is also located in the center position or near the center position of the rotating part 11, so that the rotating part 11 is rotated, and a pull force, thrust force, or abutting force, or lever force is generated, in order to enhance the efficiency of use; whereby, when the rotating part 11 carries out a rotational movement, the rotating part 11 abuts against or pushes on another object (not shown), so that the object 10 or the other object moves, and the effects of simplicity of operation, saving labor and convenience are achieved.

In one embodiment of the present disclosure, the fixing piece 12 is a threaded piece, a column, an outer fastening body, an inner fastening body, a fastening body or a snap body. Thus, different forms of fixing piece 12 may be selected according to the actual assembly needs, so that the fixing piece 12 passes through the object 10 and combines with the fixing part 112, and then the rotating part 11 is movably combined with the object 10; thus, the object 10 is movably combined with the lateral perforation part 111 firmly, in order to facilitate subsequent operations.

In one embodiment of the present disclosure, there is an anti-loosening substance 113 in an intermediate space for anti-loosening at combining between the fixing piece 12 and the fixing part 112 of the rotating part 11, the anti-loosening substance is a soft substance, a colloidal substance, an elastic substance, a metallic substance, a plastic substance, a non-metallic substance, a flexible substance, a liquid substance, or a solid substance. The anti-loosening substance 113 may be an adhesive or solder, so that the fixing piece 12 is firmly combined to the fixing part 112 to provide that the rotating part 11 is movably combined with the object 10; thus, the object 10 is movably combined with the lateral perforation part 111 firmly, in order to facilitate subsequent operations.

In one embodiment of the present disclosure, the object 10 is a printed circuit board, a chassis, a metallic sheet or a plastic body. Thus, the present disclosure can further meet the needs of practical application.

In one embodiment of the present disclosure, the rotating part 11 is movably combined with a fastening part 13, the fastening part 13 is combined with the rotating part 11 by a joint part 131, and further comprises an elastic element 14, one end of the elastic element 14 abuts against the rotating part 11, the other end of the elastic element 14 abuts against the fastening part 13. Thus, by the fastening part 13 fastening to another object (not shown), the stability after assembling the rotating structure 1 and the other object can be maintained.

Figure 3:
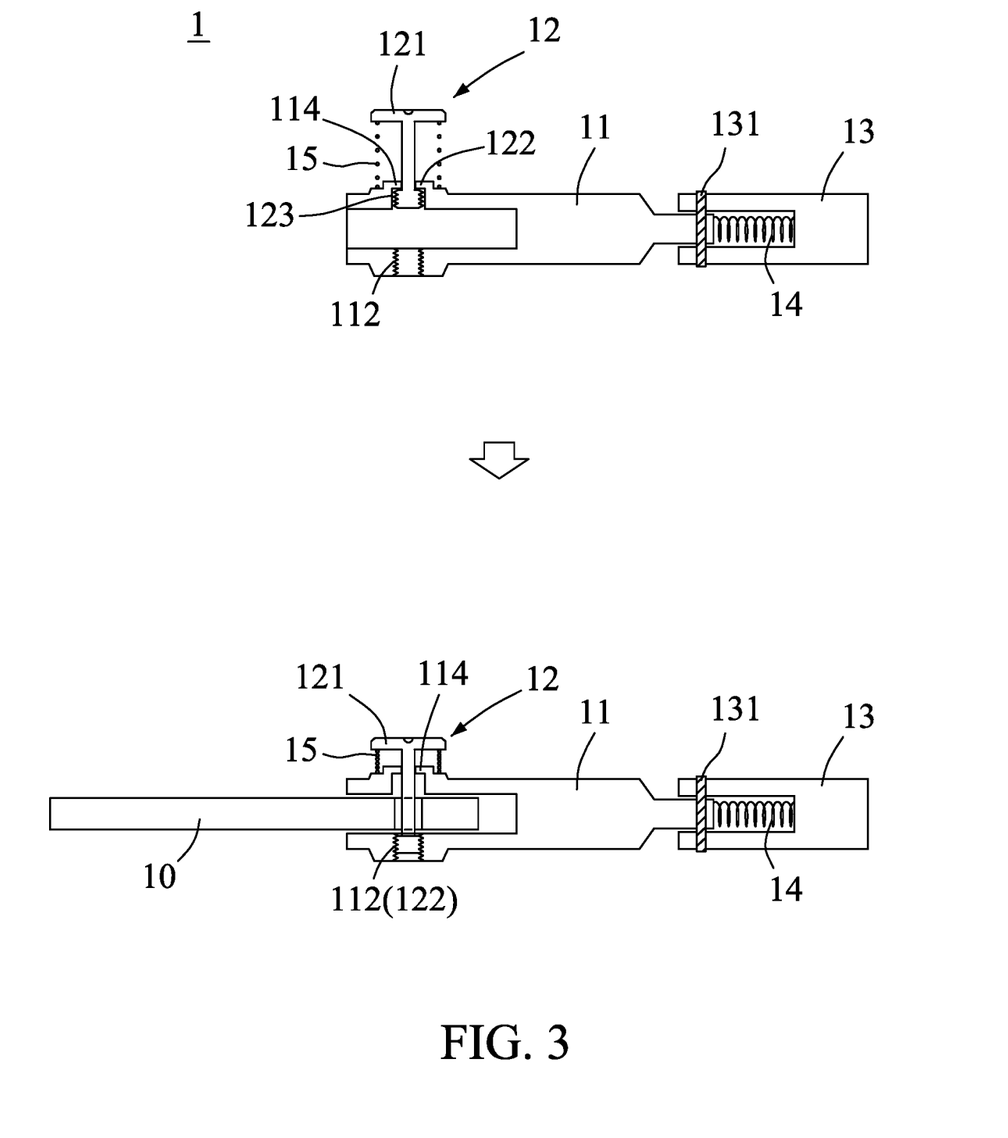
FIG. 3 is a schematic view of a using state of the rotating structure of a second embodiment of the present disclosure.

As shown in FIG. 3, when applied, in one embodiment of the present disclosure, the difference with the above embodiment is that the fixing piece 12 is movably combined to the rotating part 11, the fixing piece 12 is a fastener having a head 121 and a buckling part 122, wherein the fixing piece 12 has a stop part 123, the rotating part 11 has a corresponding stop part 114, the stop part 123 and the corresponding stop part 114 are for stopping the movable combination, whereby the fixing piece 12 may be used to movably disassemble and assemble the object 10 repeatedly in a state without leaving the rotating part 11.

In one embodiment of the present disclosure, the rotating structure 1 further comprises an elastic element 15, one end of the elastic element 15 abuts against the rotating part 11, the other end of the elastic element 15 abuts against the head 121 of the fixing piece 12. Thus, force may be applied to the head 121 of the fixing piece 12, so that the buckling part 122 is combined to the fixing part 112, and the elastic element 15 is compressed after assembly to complete the assembly; when disengaging, force is applied to the head 121 of the fixing piece 12, so that the buckling part 122 is separated from the fixing part 112, and the elastic recovery of the elastic element 15 lifts the fixing piece 12 up for the next assembly, so that the fixing piece 12 may be movably disassembled and assembled the object 10 repeatedly in a state without leaving the rotating part 11, and thus the present disclosure can further meet the needs of practical application.

Figure 4:
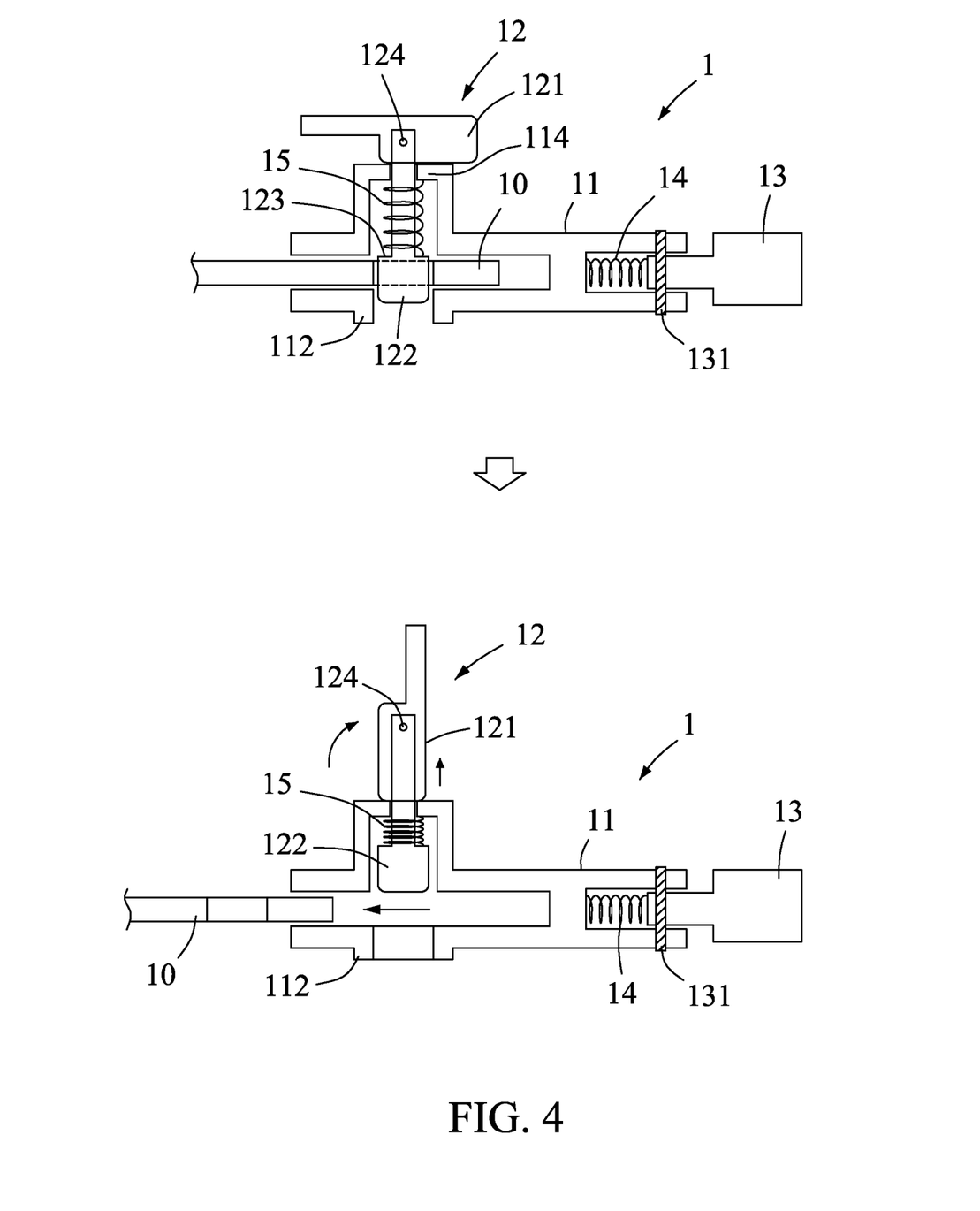
FIG. 4 is a schematic view of a using state of the rotating structure of a third embodiment of the present disclosure.

Referring to FIG. 4, in one embodiment of the present disclosure, the difference from the above embodiment is that the head 121 of the fixing piece 12 is movably combined with the buckling part 122 by a bolting part 124, one end of the elastic element 15 abuts against the rotating part 11, the other end of the elastic element 15 abuts against the buckling part 122. Thus, the head 121 of the fixing piece 12 may be pulled by force, so that the buckling part 122 is combined with the fixing part 112, and the elastic element 15 is compressed after assembly to complete the assembly; when disengaging, the head 121 of the fixing piece 12 is reversely pulled by force, so that the buckling part 122 is separated from the fixing part 112, and the elastic recovery of the elastic element 15 lifts the fixing piece 12 up for the next assembly, so that the fixing piece 12 may be movably disassembled and assembled the object 10 repeatedly in a state without leaving the rotating part 11, and thus the present disclosure can further meet the needs of practical application.

Figure 5:
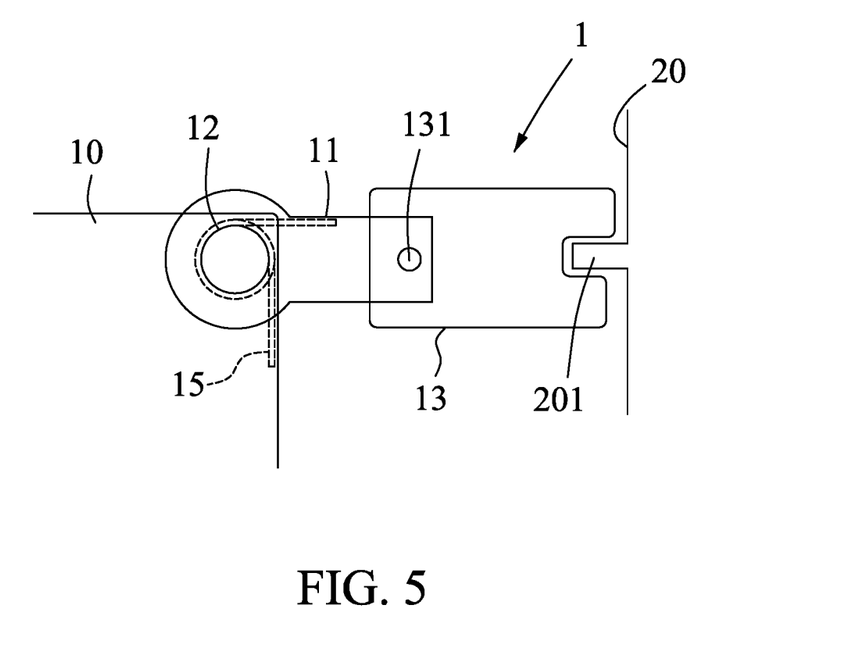
FIG. 5 is a schematic view of a using state of the rotating structure of a fourth embodiment of the present disclosure.

Referring to FIG. 5, in one embodiment of the present disclosure, the difference with the above embodiment is that the rotating part 11 has a fastening part 13, the fastening part 13 is used to fasten to a corresponding fastening part 201 of the other object 20. Thus, by the fastening part 13 fastening to the corresponding fastening part 201 of the other object 20, the stability after assembling the rotating structure 1 and the other object 20 can be maintained.

In one embodiment of the present disclosure, the rotating structure 1 further comprises an elastic element 15, one end of the elastic element 15 abuts against the rotating part 11, the other end of the elastic element 15 abuts against the object 10 to make the rotating part 11 carry out reciprocating motion or reciprocating rotation with elastic force, so that the present disclosure can further meet the needs of practical application.

Figure 6:
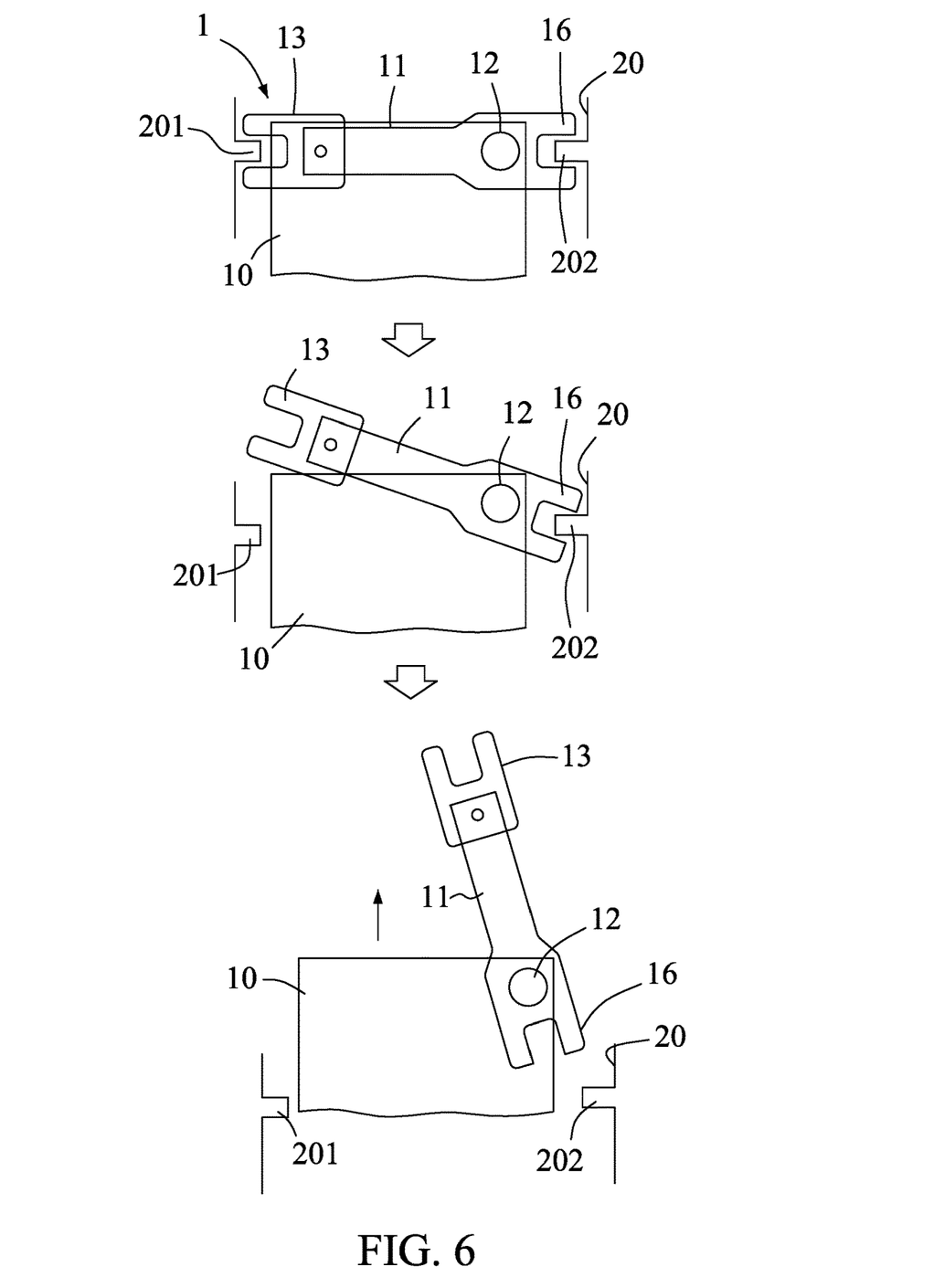
FIG. 6 is a schematic view of a using state of the rotating structure of a fifth embodiment of the present disclosure.
Figure 7:
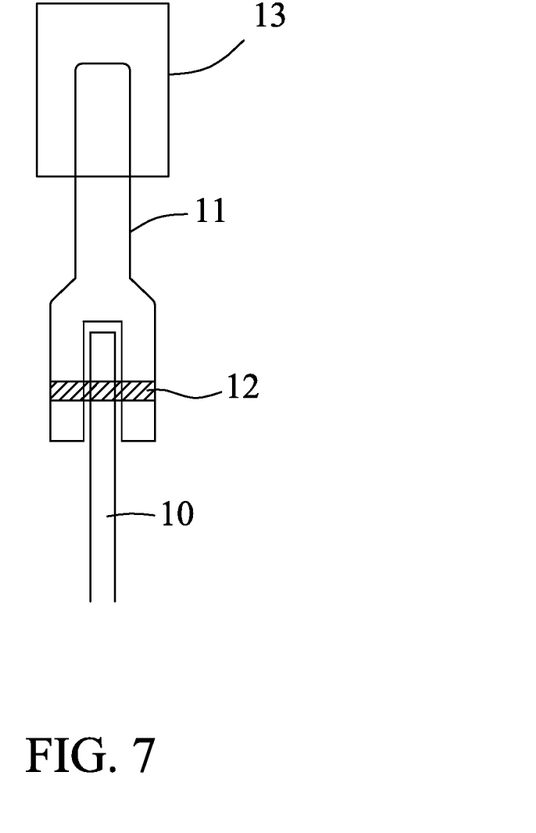
FIG. 7 is a schematic view of the rotating structure of the fifth embodiment of the present disclosure.

Referring to FIGS. 6 and 7, in one embodiment of the present disclosure, the difference with the above embodiment is that the rotating part 11 further comprises an abutting part 16, and a center of the object 10 is located in a center position or near the center position of the rotating part 11. Thus, by the fastening part 13 fastening to the other object 20 or the corresponding fastening part 201, the abutting part 16 is fastened to the abutted object 202, and when disengaging, the fastening part 13 is separated from the corresponding fastening part 201, and the rotating part 11 is rotated to abut an abutted object 202 of the other object 20 with the abutting part 16, so that the other object 20 generates a movement, and when the object 10 or the other object 20 is moved, the effects of simplicity of operation, saving labor and convenience are achieved.

Figure 8:
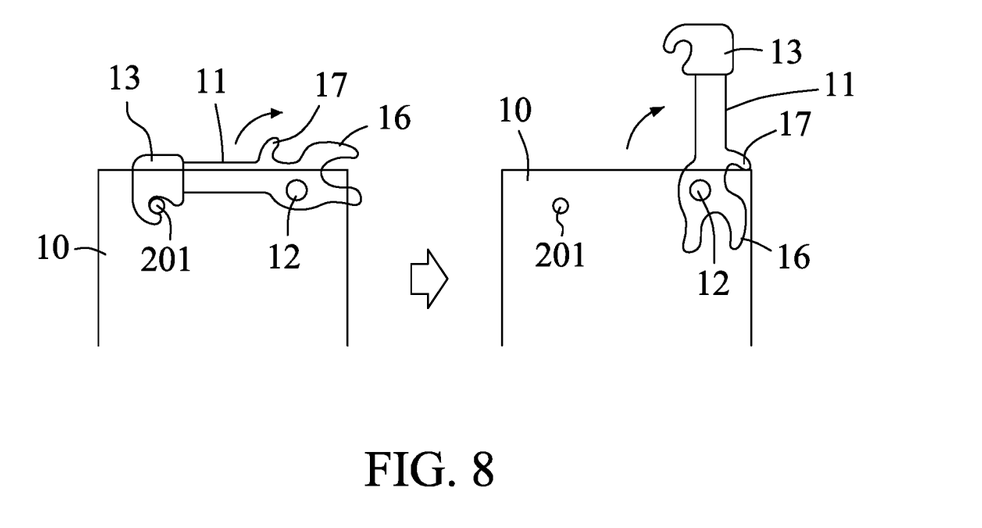
FIG. 8 is a schematic view of the rotating structure of a sixth embodiment of the present disclosure.
Figure 9:
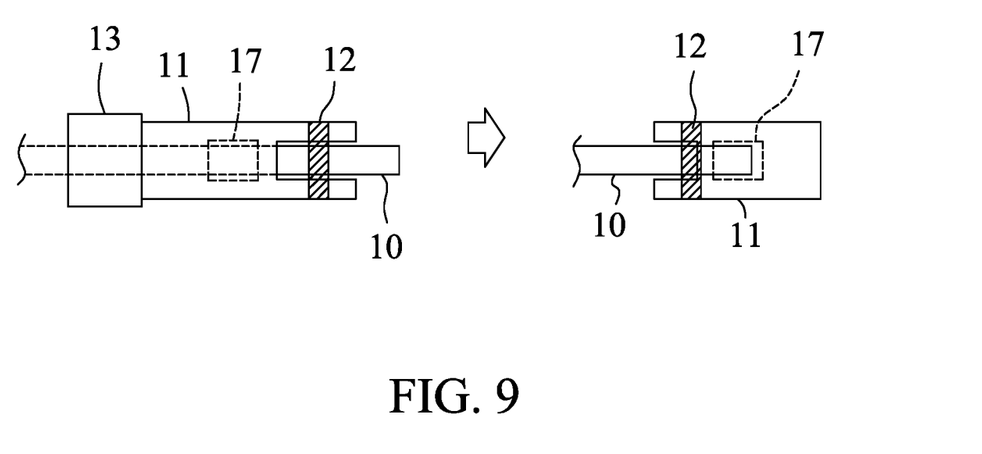
FIG. 9 is a schematic view of a using state of the rotating structure of the sixth embodiment of the present disclosure.

Referring to FIGS. 8 and 9, in one embodiment of the present disclosure, the difference from the above embodiment is that the rotating part 11 has a blocking part 17. Thus, when the rotating part 11 is rotated to an angle, the blocking part 17 may be used to block the object 10 to avoid the rotating part 11 having an oversteer situation.

In one embodiment of the present disclosure, the blocking part 17 is located in the lateral perforation part 111, or the blocking part 17 is located in a center position or near the center position of one side of the lateral perforation part 111, or the blocking part 17 is located in the near center position of the lateral perforation part 111, thus, the blocking part 17 may be provided in different positions according to the actual assembly requirements, so that the present disclosure can further meet the needs of practical application.

In one embodiment of the present disclosure, the blocking part 17 is a convex part, a concave part, a sheet, a block, provided in a wall surface of the lateral perforation part 111, or being a partial structure of the lateral perforation part 111, or the blocking part 17 is a groove of the lateral perforation part 111, or the blocking part 17 is a penetration of the lateral perforation part 111, thus, different types of the blocking part 17 may be selected according to the actual use needs, so that the present disclosure can further meet the needs of practical application.

Figure 10:
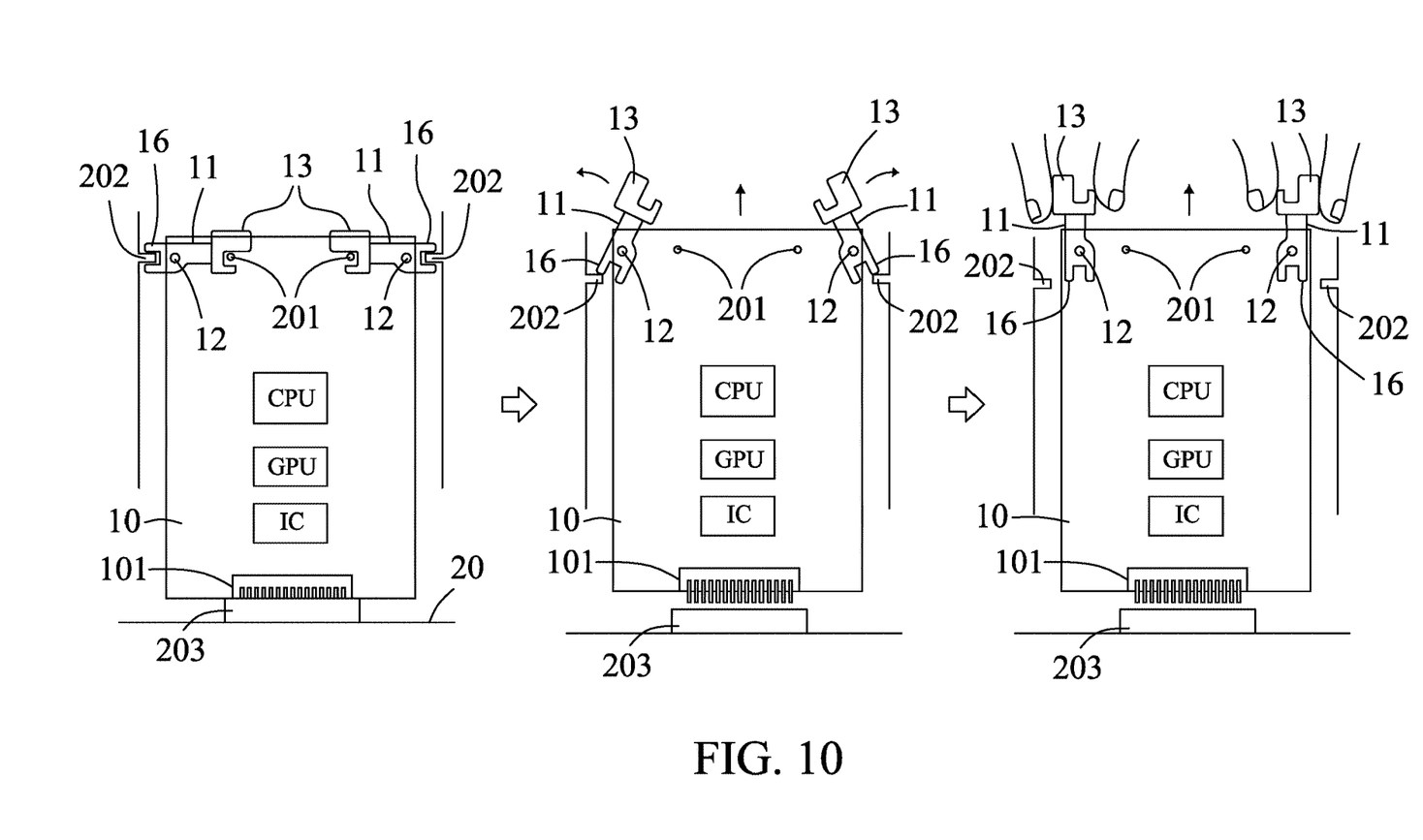
FIG. 10 is a schematic view of a using state of the rotating structure of a seventh embodiment of the present disclosure.

Referring to FIG. 10, in one embodiment of the present disclosure, the difference from the above embodiment is that the object 10 has a connector 101, the connector 101 is used to connect with another connector 203 of another object 20 by on-state current, when the rotating structure 1 is rotated, the rotating part 11 is rotated to abut against the abutted object 202 with the abutting part 16, so that the other object 20 generates a movement, by rotating the force that abuts against the abutted object 202 to drive the object 10, the hot-swappable connector 101 is disengaged or loosened from the other connector 203, and when the object 10 or the other object 20 is moved, the effects of simplicity of operation, saving labor and convenience are achieved.

In one embodiment of the present disclosure, the object 10, the other object 20 or the abutted object 202 may be a printed circuit board, motherboard, chassis, computer case, radiator, slide rail, cabinet, disk body, cage, air-cooled structure, water-cooled structure, structure immersed in water-cooled liquid, server structure or storage structure, so that the present disclosure can further meet the needs of practical application.

Figure 11:
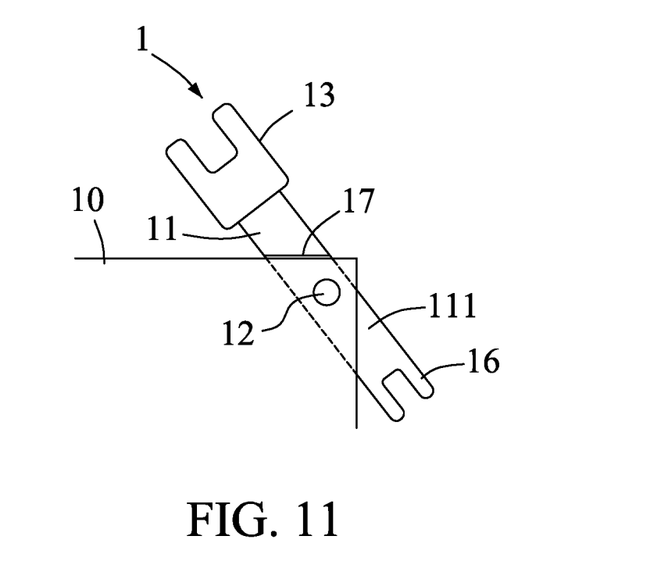
FIG. 11 is a schematic view of a using state of the rotating structure of an eighth embodiment of the present disclosure.

Referring to FIG. 11, in one embodiment of the present disclosure, the difference from the above embodiment is that the lateral perforation part 111 of the rotating structure 1 is a movable space with one-sided opening or double-sided opening, when used in the motion of the rotating structure 1, a limitation of the movable space is used, so that the object 10 moves within a range of the movable space, so that the present disclosure can further meet the needs of practical application.

Figure 12:
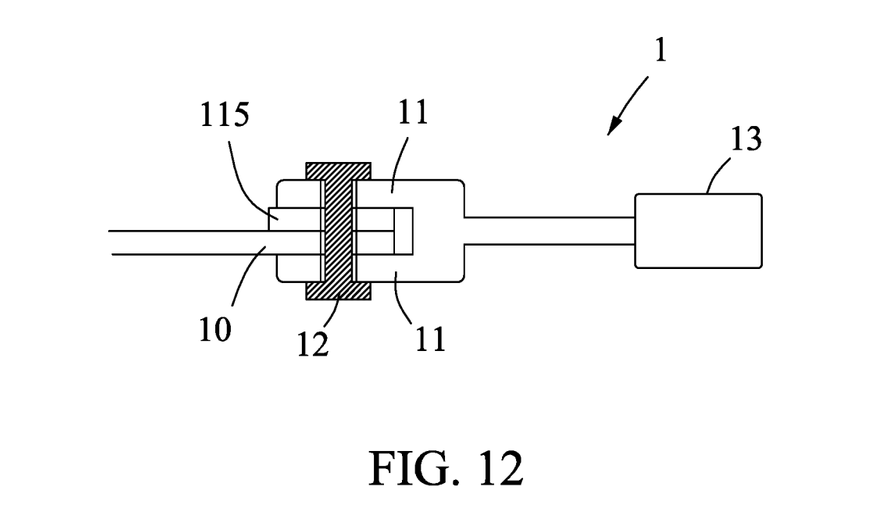
FIG. 12 is a schematic view of a using state of the rotating structure of a ninth embodiment of the present disclosure.

Referring to FIG. 12, in one embodiment of the present disclosure, the difference from the above embodiment is that there is an elastomer 115 (or a cushion) between the lateral perforation part 111 of the rotating structure 1 and the object 10, the fixing piece 12 is provided to pass through the lateral perforation part 111, the elastomer 115 and the object 10, the elastomer 115 is used to increase or decrease the friction force between the lateral perforation part 111 and the object 10, or to provide a cushioning force between the lateral perforation part 111 and the object 10, or to fill a space between the lateral perforation part 111 and the object 10, or to provide an elastic force between the lateral perforation part 111 and the object 10, so that the present disclosure can further meet the needs of practical application.

In one embodiment of the present disclosure, the elastomer 115 (or the cushion) may be a spring, spring plate, gasket, metallic object, plastic object, nylon gasket, Teflon gasket or washer, so that the present disclosure can be more in line with the needs of practical application.

While the present disclosure has been described by means of preferable embodiments, those skilled in the art should understand the above description is merely embodiments of the disclosure, and it should not be considered to limit the scope of the disclosure. It should be noted that all changes and substitutions which come within the meaning and range of equivalency of the embodiments are intended to be embraced in the scope of the disclosure. Therefore, the scope of the disclosure is defined by the claims.

What is claimed is:

1. A rotating structure, comprising:
    a rotating part, having a lateral perforation part, the lateral perforation part is for perforating an object;
    a fixing piece, combined to the lateral perforation part and the object, so that the rotating part is movably combined with the object for making the rotating part rotate or move the object; and
    an elastic element, one end of the elastic element abuts against the rotating part the other end of the elastic element abuts against the fixing part.

2. The rotating structure according to claim 1, wherein the rotating part further comprises an abutting part, and the rotating part is rotated to abut another object with the abutting part, so that the other object generates a movement.

3. The rotating structure according to claim 1, wherein the fixing piece is a fastener having a head and a buckling part.

4. The rotating structure according to claim 1, wherein there is an anti-loosening substance for anti-loosening between the fixing piece and the fixing part of the rotating part, the anti-loosening substance is a soft substance, a colloidal substance, an elastic substance, a metallic substance, a plastic substance, a non-metallic substance, a flexible substance, a liquid substance, or a solid substance.

5. The rotating structure according to claim 1, wherein the rotating part has a blocking part, when the rotating part is rotated to an angle, the blocking part is used to block the object.

6. The rotating structure according to claim 1, wherein the rotating part has a fastening part, the fastening part is used to fasten to a corresponding fastening part.

7. The rotating structure according to claim 1, wherein the rotating part has a fixing part, after the object is placed in the lateral perforation part, the fixing piece passes through the object and combines with the fixing part, so that the rotating part is movably combined with the object.

8. The rotating structure according to claim 1, wherein the object has a connector, the connector is used to connect with another connector of another object by on-state current, when the rotating structure is rotated, by rotating the force that abuts against an abutted object to drive, the connector is disengaged or loosened from the other connector.

9. The rotating structure according to claim 1, wherein the object has a connector, the connector is used to connect with another connector of another object by on-state current, when the rotating structure is rotated, by rotating the force that abuts against an abutted object to drive, the hot-swappable connector is disengaged or loosened from the other connector.

10. The rotating structure according to claim 1, further comprising an elastic element, one end of the elastic element abuts against the rotating part, the other end of the elastic element abuts against the object to make the rotating part carry out reciprocating motion or reciprocating rotation with elastic force.

11. The rotating structure according to claim 1, wherein the lateral perforation part is a movable space with one-sided opening or double-sided opening, when used in the motion of the rotating structure, a limitation of the movable space is used, so that the object moves within a range of the movable space.

12. The rotating structure according to claim 1, wherein there is an elastomer or a cushion between the lateral perforation part and the object, the fixing piece is provided to pass through the lateral perforation part, the elastomer or the cushion and the object, the elastomer or the cushion is used to increase or decrease the friction force between the lateral perforation part and the object, or to provide a cushioning force between the lateral perforation part and the object, or to fill a space between the lateral perforation part and the object, or to provide an elastic force between the lateral perforation part and the object.

13. A rotating structure, comprising:
    a rotating part, having a lateral perforation part, the lateral perforation part is for perforating an object; and
    a fixing piece, combined to the lateral perforation part and the object, so that the rotating part is movably combined with the object for making the rotating part rotate or move the object,
    wherein the rotating part is movably combined with a fastening part, the fastening part is combined with the rotating part by a joint part, and further comprises an elastic element, one end of the elastic element abuts against the rotating part, the other end of the elastic element abuts against the fastening part.

* * * * *